United States Patent
Holscher et al.

[11] Patent Number: 6,067,606
[45] Date of Patent: May 23, 2000

[54] COMPUTER PROCESSOR WITH DYNAMIC SETTING OF LATENCY VALUES FOR MEMORY ACCESS

[75] Inventors: Brian Holscher, Hillsboro; Jeffrey R. Jones, Aloha; James A. Wilson, Jr., Portland, all of Oreg.

[73] Assignee: Intel Corporation, Santa Clara, Calif.

[21] Appl. No.: 08/990,525

[22] Filed: Dec. 15, 1997

[51] Int. Cl.[7] .............................. G06F 1/00; G06F 12/00
[52] U.S. Cl. ........................ 711/167; 711/151; 711/150
[58] Field of Search ................................. 711/167, 151, 711/150

[56] References Cited

U.S. PATENT DOCUMENTS

| 5,201,036 | 4/1993 | Yoshimatsu | 710/107 |
| 5,655,113 | 8/1997 | Leung et al. | 713/401 |
| 5,809,340 | 9/1998 | Bertone et al. | 710/58 |
| 5,809,517 | 9/1998 | Shimura | 711/115 |

FOREIGN PATENT DOCUMENTS 2 308 475  6/1997  United Kingdom .

OTHER PUBLICATIONS

Wally Tjanaka, EPLD configures wait–state generator, EDN Access.

Toms Hardware Guide, The Overclocking Guide, http://www.tomshardware/overclock.html.

*Advanced Chipset Setup,* from the BIOS Survival Guide, Website at http://www.lexology.co.uk/bios/frmain01.htm.

*Primary Examiner*—Eddie P. Chan
*Assistant Examiner*—Jan S. Williams, II
*Attorney, Agent, or Firm*—Kenyon & Kenyon

[57] ABSTRACT

A computer processor includes a dynamic latency module. The dynamic latency module includes a read-only memory ("ROM") in which is stored a plurality of sets of latency values. The dynamic latency module further includes a register coupled to the ROM and adapted to store at least one set of the plurality of sets of latency values. The dynamic latency module dynamically sets a plurality of memory access latency values by determining an operating speed of the processor and implementing one of the plurality of sets of latency values based on the operating speed.

29 Claims, 3 Drawing Sheets

COMPUTER PROCESSOR WITH DYNAMIC SETTING OF LATENCY VALUES FOR MEMORY ACCESS

FIELD OF THE INVENTION

The present invention is directed to a computer processor. More particularly, the present invention is directed to a computer processor with dynamic setting of latency values.

BACKGROUND OF THE INVENTION

In a typical computer system, a processor interfaces with a memory device over a bus. When a processor submits a request to a memory device, the response from the memory device can be read by the processor from the bus after a delay of time, referred to as a "latency." For example, a processor may issue a read request to a cache memory system. After a period of time, the cache memory system will respond by placing the requested data on the bus. The processor can then receive the data from the bus after the latency has expired. If the processor attempts to receive the data from the bus before the latency has expired, the processor will likely receive inaccurate and invalid data.

The amount of latency can vary depending on the type of request. The amount of latency can also vary among the same type of requests. For example, a memory device may require 100–150 microseconds to respond to a read request, but only 50–100 microseconds to respond to a write request.

A processor, in advance of issuing a memory request, typically stores a latency value for each type of request. Therefore, when issuing a request, the processor can determine the period of time that it must wait until valid data in response to the request can be received from the bus.

In most prior art processors, such as the Pentium® processor from Intel Corp., the latency values are fixed within the processor. In the Pentium® processor, the latency values are in terms of a number of processor clock cycles. Therefore, a read operation of a cache memory system may be assigned a fixed latency value of 20 clock cycles for the cache to respond. The processor will then always wait 20 clock cycles after issuing a cache read instruction before it receives the response from the bus.

However, having fixed latency values based on clock cycles can cause inefficiencies when a processor is operated at less than its intended speed. For example, a processor intended to operated at 100 MHz may have a fixed latency value for a cache read operation of 20 clock cycles. If this 100 MHz processor is instead operated at only 50 MHz, each clock cycle will take twice as long than at 100 MHz. Therefore, the fixed latency value of 20 clock cycles causes the processor at 50 MHz to wait twice as long as necessary before receiving information from a cache read request. In other words, when operated at 50 MHz, valid data from a cache read request will be available to the processor after 10 clock cycles. However, because of the fixed latency value, the processor will wait for 20 cycles before receiving the data from the bus. This unnecessary delay causes the computer system to operate inefficiently.

Based on the foregoing, there is a need for a processor that allows memory access latency values to be dynamically set and modified.

SUMMARY OF THE INVENTION

One embodiment of the present invention is a computer processor that includes a dynamic latency module. The dynamic latency module includes a read-only memory ("ROM") in which is stored a plurality of sets of latency values, and a register coupled to the ROM and adapted to store at least one set of the plurality of sets of latency values.

DETAILED DESCRIPTION

Figure 1:
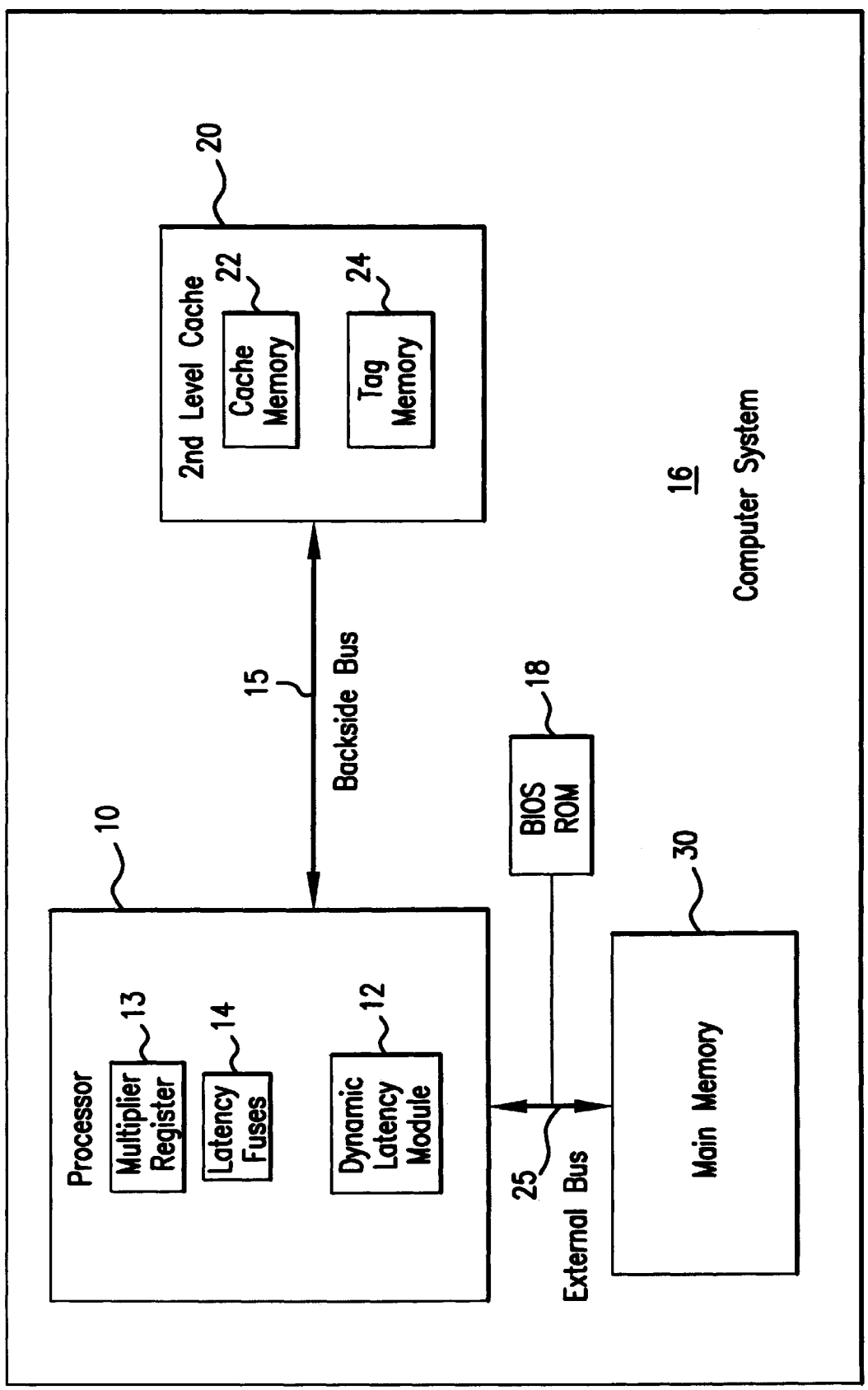
FIG. 1 is a block diagram of a computer system in accordance with one embodiment of the present invention.

FIG. 1 is a block diagram of a computer system 16 in accordance with one embodiment of the present invention. Computer system 16 includes a processor 10 coupled to main memory 30 over an external bus 25. Main memory 30 may be comprised of dynamic random access memory ("DRAM"). Computer system 16 further includes a second level cache memory system 20 coupled to processor 10 over a backside bus 15. A basic input/output system ("BIOS") read-only memory ("ROM") that stores BIOS code executed by processor 10 is also included in computer system 16. The BIOS code is typically executed by processor 10 when computer 16 is initiated.

Processor 10 includes a plurality of latency fuses 14. Latency fuses 14 can be blown, or "set". A binary value of each latency fuse is based on whether or not it is set (i.e., a set fuse is a binary "1", a non-set fuse is a binary "0"). The binary value of latency fuses 14 can be read by logic in processor 10. In one embodiment, processor 10 includes four latency fuses.

Processor 10 further includes a dynamic latency module 12 which allows latency values to be dynamically set by processor 10. In one embodiment, a set of twelve latency values are used by processor 10 when accessing cache 20. One example of a type of latency values is the value of the amount of latency between a read request from processor 10 and a data hit or miss indication returned from cache 20. Another example is the value of the amount of latency between a read request from processor 10 and a return of valid data from cache 20. In one embodiment, the latency values are in terms of clock cycles of processor 10 (e.g., twenty clock cycles, fifteen clock cycles, etc.).

Second level cache 20 includes a cache memory 22 and a tag memory 24. In one embodiment, cache memory 22 is comprised of static random access memory ("SRAM"). Tag memory 24 stores identifiers of memory blocks stored in cache memory 22. The identifiers stored in tag memory 24 are referred to as "tags."

Figure 2:
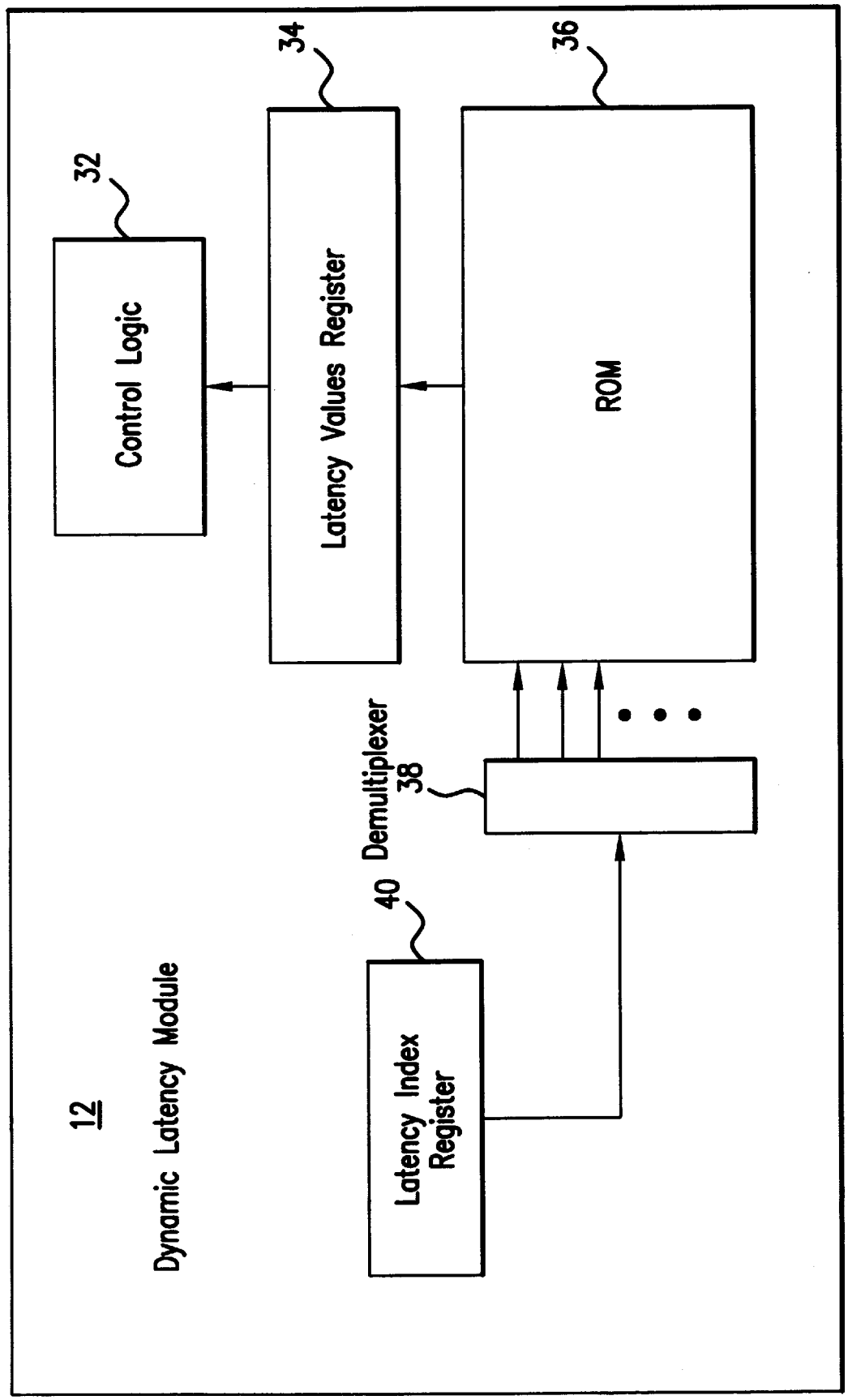
FIG. 2 is a detailed block diagram of a dynamic latency module in accordance with one embodiment of the present invention.

FIG. 2 is a detailed block diagram of dynamic latency module 12 in accordance with one embodiment of the present invention. Dynamic latency module 12 includes control logic 32 and a latency values register 34. Latency values register 34 stores a set of latency values which includes a latency value for each type of access operation by processor 10 of cache 20. Control logic 32 implements the latency values for processor 10 during each access operation. In one embodiment, control logic 32 is comprised of a plurality of counters that count the clock cycles specified by each latency value when an access operation to cache 20 is initiated. For example, if the latency value between a read request and valid data is twenty clock cycles, control logic will count twenty clock cycles and then instruct processor 10 to retrieve the data from backside bus 15.

Dynamic latency module 12 further includes a latency index register 40 coupled to a demultiplexer 38 and a ROM 36. Latency index register 40 stores a latency index that corresponds to a set of latency values. In one embodiment, the latency index stored in latency index register 40 is a four-bit binary value, for a total of sixteen latency indexes. Each latency index has associated with it a set of twelve latency values.

Demultiplexer 38 demultiplexes the latency index stored in latency index register 40. In one embodiment, demultiplexer 38 is a four-to-sixteen bit demultiplexer. The demultiplexed output from demultiplexer 38 is coupled to ROM 36. ROM 36 stores the plurality of sets of latency values associated with each latency index. The latency values retrieved from ROM 36 are based on the output of demultiplexer 38. The retrieved latency values are placed in latency value register 34 where they are accessed by control logic 32.

Figure 3:
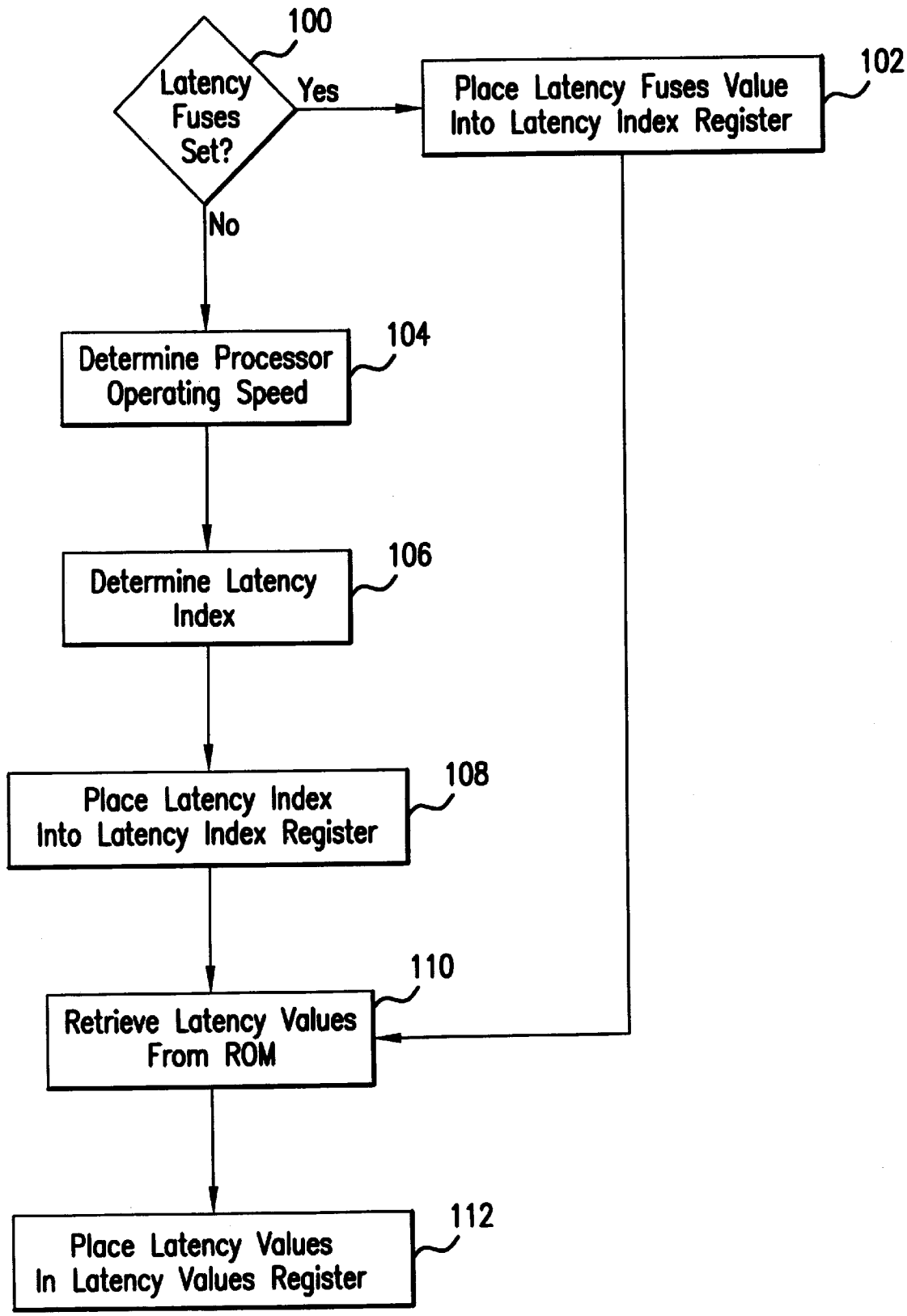
FIG. 3 is a flowchart of steps executed by the processor in accordance with one embodiment of the present invention.

FIG. 3 is a flowchart of steps executed by processor 10 in accordance with one embodiment of the present invention. In one embodiment, some of the steps of FIG. 3 are stored as software in BIOS ROM 18 as portion of the BIOS code of computer system 16. Other steps of FIG. 3 are executed in hardware by dynamic latency module 12.

At step 100, processor 10 determines whether any latency fuses 14 are set.

If any latency fuses 14 are determined to be set at step 100, the binary value of the latency fuses are placed in latency index register 40 at step 102. In one embodiment, each latency fuse 14 that is set represents a binary "1". Therefore, for example, if latency fuses 14 include four latency fuses, and, from left to right, the first and third latency fuses are set, the binary value "1010" will be placed in latency index register 40 at step 102.

At step 104, if no latency fuses 14 are set, the operating speed of processor 10 (e.g., 150 MHz), also referred to as the "core frequency", is determined. The operating speed of processor 10 is the actual speed (as opposed to the maximum rated speed) that processor 10 is executing instructions. In one embodiment, the operating speed is determined from two parameters. The first parameter is the speed of external bus 25. This first parameter can be determined by reading an external bus pin on processor 10. In one embodiment, external bus 25 operates at either 66 or 100 MHz. The second parameter is an operating speed multiplier that is stored in a multiplier register 13 of processor 10 when processor 10 is initiated and executes the BIOS code. The frequency of external bus 25 multiplied by the multiplier is the operating speed of processor 10. For example, if the external bus 25 operates at 100 MHz and the multiplier has a value of 1.5, the core frequency of the processor 10 would be (100 MHz*1.5)=150 MHz.

At step 106, the latency index is determined. In one embodiment, one latency index corresponds to each operating speed of processor 10. In this embodiment, a look-up table that is part of the BIOS code provides the latency index based on the operating speed of processor 10.

At step 108, the determined latency index from step 106 is placed in latency index register 40.

At step 110, a latency index has been placed in latency index register 40. The latency index is based on either the operating speed of processor 10 (from step 108) or the value of latency fuses 14 (from step 102). The latency index is demultiplexed by demultiplexer 38. Based on the demultiplexed index, a set of latency values from ROM 36 are retrieved.

Finally, at step 112, the latency values retrieved from ROM 36 are placed in latency values register 34. The latency values are then used by control logic 32 when processor 10 accesses cache 20.

As described, the present invention enables latency values to be dynamically set by a processor. The latency values can be based on the processor's operating speed. Therefore, if the processor is operating at a slower than rated speed, the latency values can be correspondingly decreased so the processor operates more efficiently. Further, the present invention includes fuses that can be set to override the dynamically set latency values.

Several embodiments of the present invention are specifically illustrated and/or described herein. However, it will be appreciated that modifications and variations of the present invention are covered by the above teachings and within the purview of the appended claims without departing from the spirit and intended scope of the invention.

For example, although in the described embodiments the present invention is used with a cache memory, the present invention can be used with any memory device that requires latency values when being accessed.

What is claimed is:

1. A computer processor comprising:

a dynamic latency module for determining a set of latency values based on an operating speed of said computer processor, said dynamic latency module comprising:

a read-only memory, said ROM having stored thereon a plurality of sets of latency values; and a first register coupled to said ROM and adapted to store at least one set of said plurality of sets of latency values.

2. The computer processor of claim 1, said dynamic latency module further comprising:

a second register coupled to said ROM and adapted to store a plurality of latency indexes, wherein each set of said plurality of sets of latency values stored in said ROM are indexed to one of said plurality of latency indexes.

3. The computer processor of claim 1, said dynamic latency module further comprising:

control logic coupled to said first register, said control logic adapted to implement one set of said plurality of sets of latency values when the processor accesses a memory device.

4. The computer processor of claim 1, wherein said processor is adapted to:

determine said operating speed of said computer processor; and determine one of said plurality of latency indexes based on said operating speed.

5. The computer processor of claim 4, wherein the processor is adapted to be coupled to an external bus and wherein said operating speed is determined by:

determining an operating speed of the external bus;

retrieving an operating speed multiplier; and multiplying said operating speed of the external bus by said operating speed multiplier.

6. The computer processor of claim 5, further comprising a multiplier register, wherein said operating speed multiplier is stored in said multiplier register.

7. The computer processor of claim 1, said dynamic latency module further comprising:

a demultiplexer coupled to said second register and said ROM.

8. The computer processor of claim 1, further comprising:

a plurality of latency fuses having a binary value.

9. The computer processor of claim 8, said processor adapted to place said binary value in said second register.

10. The computer processor of claim 4, said processor adapted to place said one of said plurality of latency indexes in said second register.

11. The computer processor of claim 1, wherein each of said latency values comprise at least one processor clock cycle.

12. The computer processor of claim 1, wherein the memory device is a cache memory system.

13. A method of dynamically setting a plurality of memory access latency values for a computer processor, said method comprising the steps of:

(a) determining an operating speed of the processor; and (b) determining said plurality of latency values based on said operating speed.

14. The method of claim 13 further comprising the steps of:

(c) placing said plurality of latency values in a first register.

15. The method of claim 13, wherein step (a) comprises the steps of:

(a-1) determining an operating speed of an external bus;

(a-2) retrieving an operating speed multiplier; and (a-3) multiplying the operating speed of the external bus by the operating speed multiplier.

16. The method of claim 14, wherein step (b) comprises the steps of:

(b-1) determining a latency index based on said operating speed of the processor;

(b-2) placing said latency index in a second register; and (b-3) retrieving, using said latency index, said plurality of latency values from a read-only memory, said read-only memory having stored thereon a plurality of sets of latency values.

17. The method of claim 13, further comprising the steps of:

(d) determining whether at least one of a plurality of fuses is set; and (e) if it is determined that at least one of said plurality of fuses is set, bypassing steps (a) and (b) and determining said plurality of latency values based on a value of said plurality of fuses.

18. The method of claim 13, wherein said memory access latency values are implemented when a cache memory is accessed.

19. A computer system comprising:

a processor; and a memory device coupled to said processor;

wherein said processor comprises a dynamic latency module for determining a set of latency values based on an operating speed of said processor, said dynamic latency module comprising:

a read-only memory (ROM), said ROM having stored thereon a plurality of sets of latency values; and a first register coupled to said ROM and adapted to store at least one set of said plurality of sets of latency values.

20. The computer system of claim 19, said dynamic latency module further comprising:

a second register coupled to said ROM and adapted to store a plurality of latency indexes, wherein each set of said plurality of sets of latency values stored in said ROM are indexed to one of said plurality of latency indexes.

21. The computer system of claim 19, said dynamic latency module further comprising:

a control logic coupled to said first register, said control logic adapted to implement one set of said plurality of sets of latency values when said processor accesses said memory device.

22. The computer system of claim 19, wherein said processor is adapted to:

determine said operating speed of said processor; and determine one of said plurality of latency indexes based on said operating speed.

23. The computer system of claim 22, further comprising:

an external bus coupled to said processor;

wherein said operating speed is determined by:
  determining an operating speed of said external bus;
  retrieving an operating speed multiplier; and
  multiplying said operating speed of the external bus by said operating speed multiplier.

24. The computer system of claim 23, said processor further comprising:

a multiplier register;

wherein said operating speed multiplier is stored in said multiplier register.

25. The computer system of claim 20, said dynamic latency module further comprising:

a demultiplexer coupled to said second register and said ROM.

26. The computer system of claim 19, said processor further comprising:

a plurality of latency fuses having a binary value.

27. The computer system of claim 26, said processor adapted to place said binary value in said second register.

28. The computer system of claim 26, said processor adapted to place said one of said plurality of latency indexes in said second register.

29. The computer system of claim 19, wherein said memory device is a cache memory system.

* * * * *